United States Patent
Bryant et al.

[11] Patent Number: 5,909,324
[45] Date of Patent: Jun. 1, 1999

[54] MOUNT FOR ADJUSTING AN OPTICAL COMPONENT

[75] Inventors: Robert C. Bryant, Honeoye Falls; Timothy A. Peter, Hilton, both of N.Y.

[73] Assignee: Eastman Kodak Company, Rochester, N.Y.

[21] Appl. No.: 09/018,371

[22] Filed: Feb. 4, 1998

[51] Int. Cl.[6] .................................................. G02B 7/02
[52] U.S. Cl. ........................................ 359/822; 359/694
[58] Field of Search .................................. 359/822, 813, 359/823, 814, 694, 699, 700, 701

[56] References Cited

U.S. PATENT DOCUMENTS

| | | | |
|---|---|---|---|
| 4,496,416 | 1/1985 | Mächler et al. | 156/293 |
| 4,880,301 | 11/1989 | Gross . | |
| 5,138,496 | 8/1992 | Pong | 359/822 |
| 5,194,993 | 3/1993 | Bedzyk | 359/813 |
| 5,245,478 | 9/1993 | Luecke | 359/822 |
| 5,488,514 | 1/1996 | Bruning et al. | 359/811 |
| 5,506,731 | 4/1996 | Smiley | 359/822 |
| 5,579,176 | 11/1996 | Ikegame et al. | 359/822 |
| 5,731,918 | 3/1998 | Parr-Burman et al. | 359/822 |

*Primary Examiner*—Hung Xuan Dang
*Attorney, Agent, or Firm*—Roger A. Fields

[57] ABSTRACT

A mount for adjusting an optical component, comprises a support for the optical component that is pivotable only about a single axis and which is resiliently urged in one direction about the single axis, and a pair of adjusting cams movable towards and away from each other in contact with the support alternatively to pivot the support about the single axis in a reverse direction which is opposite to the one direction and to allow the support to be return-urged in the one direction.

7 Claims, 3 Drawing Sheets

MOUNT FOR ADJUSTING AN OPTICAL COMPONENT

FIELD OF THE INVENTION

The invention relates generally to the field of optics, and in particular to a mount for adjusting an optical component.

BACKGROUND OF THE INVENTION

Many devices include optical components which must be adjusted accurately in order to function as intended. For this reason, the optical components are often provided with adjustable mounts.

One of the main problems in prior art mounts for adjusting optical components is that the mounts cannot be easily adjusted to a precise position. This problem is discussed in commonly assigned U.S. Pat. No. 4,880,301 issued Nov. 14, 1989.

SUMMARY OF THE INVENTION

A mount for adjusting an optical component, comprising:

a support for the optical component that is pivotable only about a single axis and which is resiliently urged in one direction about the single axis; and a pair of adjusting cams movable towards and away from each other in contact with the support alternatively to pivot the support about the single axis in a reverse direction which is opposite to the one direction and to allow the support to be return-urged in the one direction.

DETAILED DESCRIPTION OF THE INVENTION

The invention is disclosed as being embodied preferably in a mount for adjusting an optical component. Because the features of this type of mount are generally known, the description which follows is directed in particular only to those elements forming part of or cooperating directly with the disclosed embodiment. It is to be understood, however, that other elements may take various forms known to a person of ordinary skill in the art.

Figure 1:
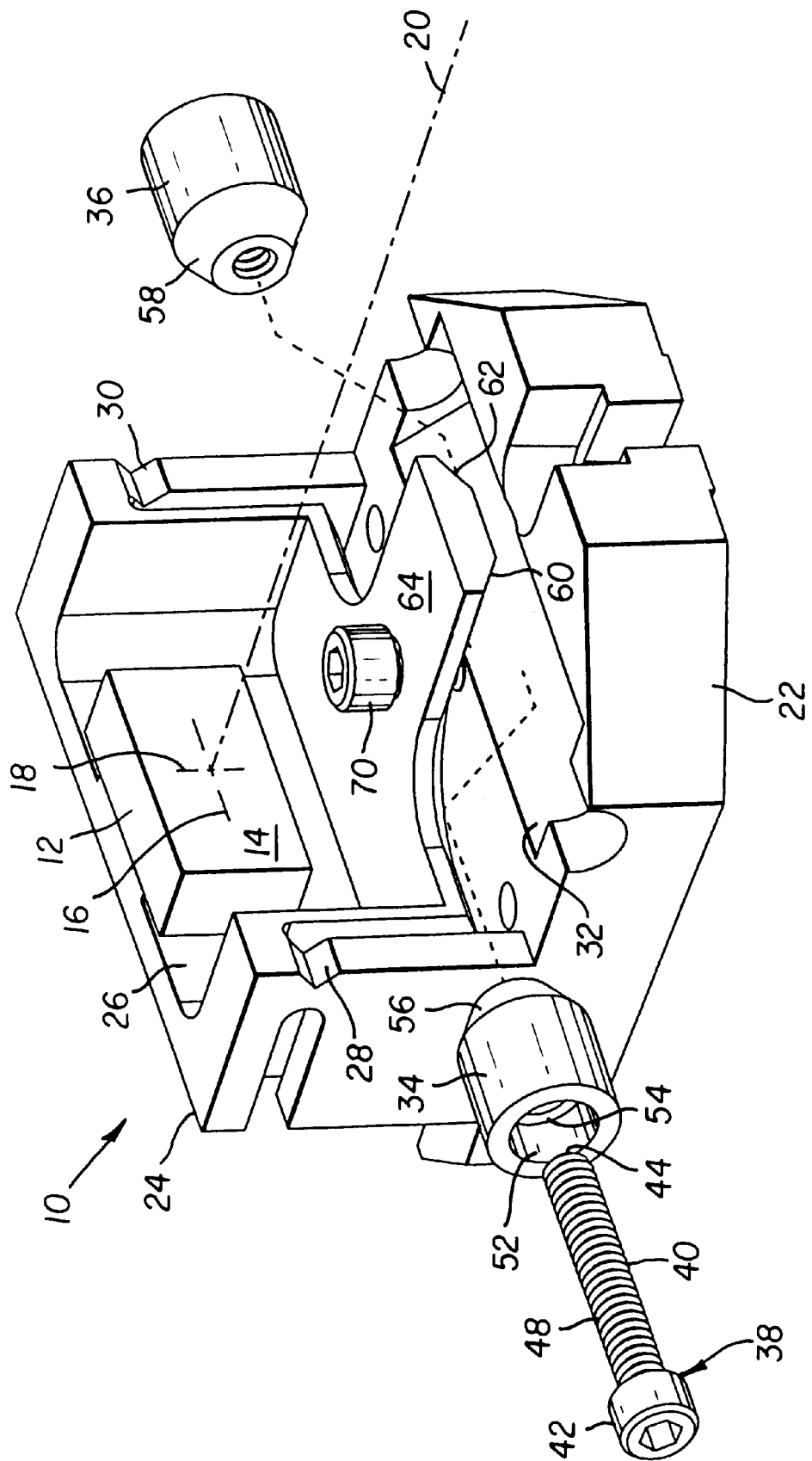
FIG. 1 is a partially-exploded perspective view of a mount for an optical component.
Figure 2:
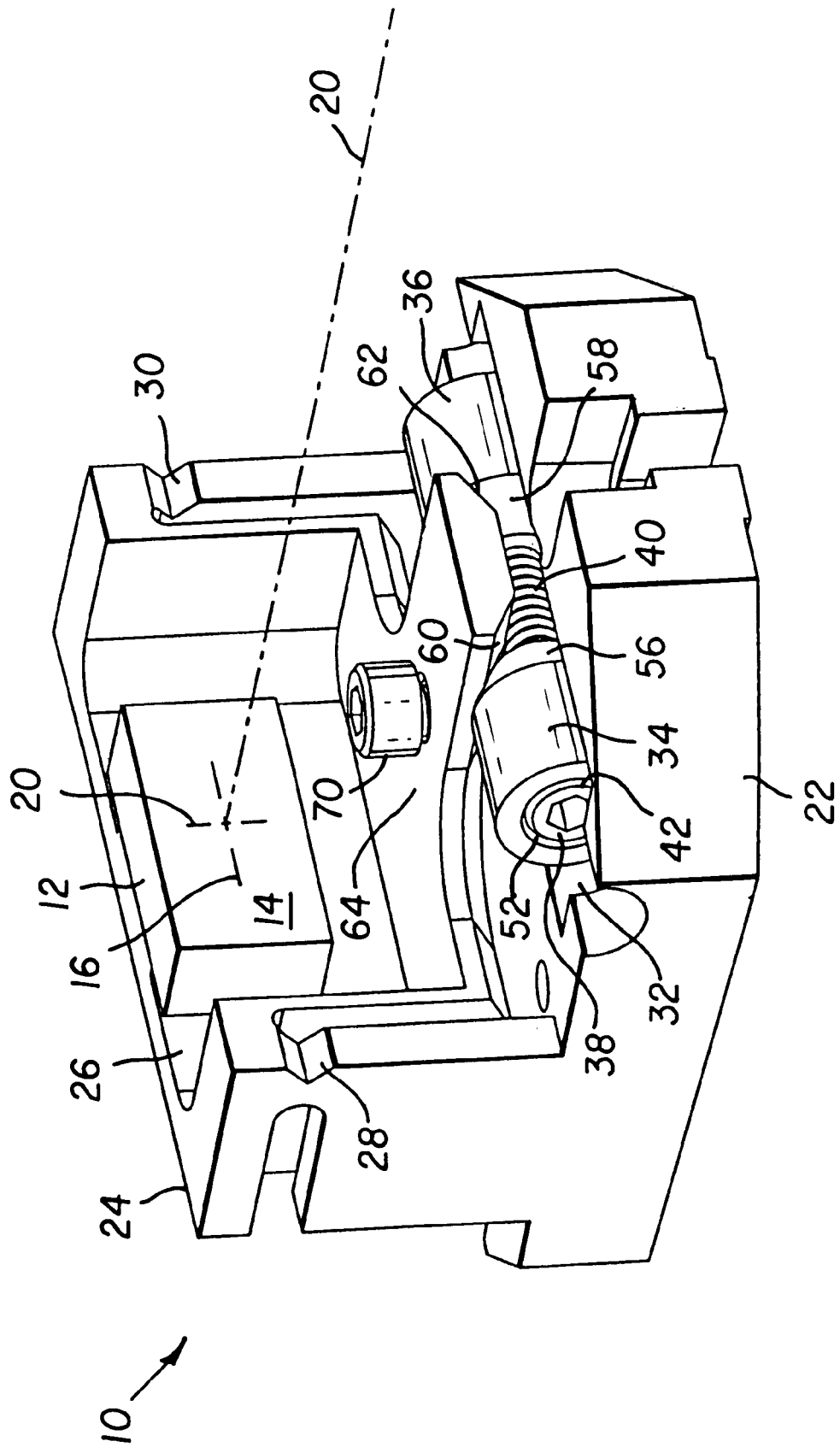
FIG. 2 is an assembled perspective view of the mount.
Figure 3:
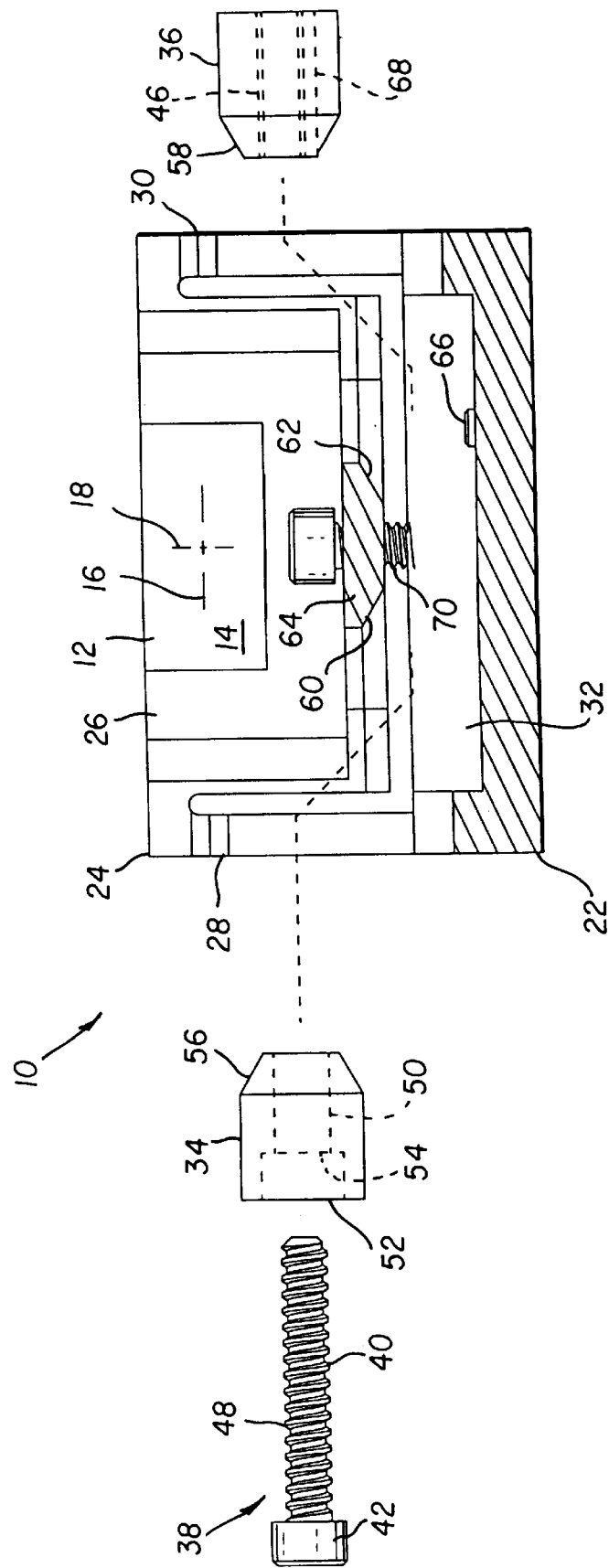
FIG. 3 is a partially-exploded sectional view of the mount.

Referring now to the drawings, FIGS. 1–3 show a mount 10 for adjusting an optical component.

The optical component, by way of example, is a rectangular shaped mirror 12 which has a flat front reflection plane 14. FIGS. 1 and 2 show mutually perpendicular x- and y-axes 16 and 18 in the reflection plane 14, and a z-axis 20 perpendicular to the reflection plane.

The mount 10 has an integrally formed base 22 and upstanding support 24. The mirror 12 is fixed to a central portion 26 of the support 24, as shown in FIGS. 1 and 2. The support 24 has a pair of identical flexure pivots 28 and 30 that resiliently urge the central portion 26 of the support clockwise in FIGS. 1 and 2 only about the x-axis 16. The pivot axis of the pair of flexure pivots 28 and 30 is common with the x-axis 16.

The base 22 has an inclined wall, flat bottom channel 32 that longitudinally extends parallel to the x-axis 16. An adjusting cam bushing 34 and an adjusting cam nut 36 partially reside in the channel 32, as shown in FIG. 2. An adjusting screw 38 has a threaded stem 40 and a wider head 42. An end portion 44 of the threaded stem 40 is located in a threaded bore 46 in the cam nut 36, and another portion 48 of the threaded stem is located in a smooth bore 50 in the cam bushing 34. The threaded stem 40, therefore, is engaged with the cam nut 36 but not with the cam bushing 34. The wider head 42 is located in an end opening 52 in the cam bushing 34 that leads to the smooth bore 50, and it rests against an annular flat 54 in the end opening. See FIG. 3.

Operation

When the adjusting screw 38 is rotated clockwise in FIG. 2, the cam bushing 34 and the cam nut 36 are translated within the channel 32 towards one another. As a result, respective conical heads 56 and 58 of the cam bushing 34 and the cam nut 36 are forced against complementary inclined faces 60 and 62 of a right-angle projection 64 from the central portion 26 of the support 24 to pivot the central portion counter-clockwise in FIG. 2 only about the x-axis 16, contrary to the resilient urging of the pair of identical flexure pivots 28 and 30. This results in a precise adjustment of the reflection plane 14 of the mirror 12. When the adjusting screw 38 is rotated counter-clockwise in FIG. 2, the cam bushing 34 and the cam nut 36 are translated within the channel 32 away from one another. As a result, the conical heads 56 and 58 of the cam bushing 34 and the cam nut 36 are retracted part-way from the inclined faces 60 and 62 of the right-angle projection 64 from the central portion 26 of the support 24 to allow the pair of identical flexure pivots 28 and 30 to pivot the central portion clockwise in FIG. 2 only about the x-axis 16. This results in a precise adjustment of the reflection plane 14 of the mirror 12. As shown in FIG. 3, a fixed upstanding post 66 in the channel 32 protrudes into a slot 68 in the cam nut 36 to prevent rotation of the cam nut as the adjusting screw 38 is rotated. A locking screw 70 can be rotated to secure the reflection plane 14 of the mirror 12 in place, once the reflection plane is adjusted.

The invention has been described with reference to a preferred embodiment. However, it will be appreciated that variations and modifications can be effected by a person of ordinary skill in the art without departing from the scope of the invention.

PARTS LIST 10. mount
12. mirror
14. reflection plane
16. x-axis
18. y-axis
20. z-axis
22. base
24. support
26. central portion of support
28. flexure pivot
30. flexure pivot
32. channel
34. adjusting cam bushing
36. adjusting cam nut
38. adjusting screw
40. threaded stem
42. wider head
44. end portion of threaded stem
46. threaded bore
48. other portion of threaded stem
50. smooth bore 52. end opening
54. annular flat
56. conical head
58. conical head
60. inclined face
62. inclined face
64. right-angle projection
66. post
68. slot
70. locking screw

What is claimed is:

1. A mount for adjusting an optical component, comprising:
   a support for the optical component that is pivotable only about a single axis and which is resiliently urged in one direction about the single axis; and
   a pair of adjusting cams movable towards and away from each other in contact with said support alternatively to pivot the support about the single axis in a reverse direction which is opposite to the one direction and to allow the support to be return urged in the one direction.

2. A mount for adjusting an optical component as recited in claim 1, wherein said support is arranged to continuously hold the optical component on the single axis.

3. A mount for adjusting an optical component as recited in claim 2, wherein said pair of adjusting cams are movable towards and away from each other parallel to the single axis.

4. A mount for adjusting an optical component as recited in claim 1, wherein a base has a guide channel in which said pair of adjusting cams are movable towards and way from each other, and mutually engaging parts fixed to said base and said pair of adjusting cams restrict movement of the adjusting cams to translation within said channel.

5. A mount for adjusting an optical component as recited in claim 1, wherein an adjusting screw is rotatable in engagement with at least one of said pair of adjusting cams to move the adjusting cams towards and away from each other.

6. A mount for adjusting an optical component as recited in claim 1, wherein said support and said pair of adjusting cams have complementary inclined surfaces which cooperate to pivot the support about the single axis in a reverse direction.

7. A mount for adjusting a mirror, comprising:
   a support for the mirror that is pivotable only about a single axis in a reflection plane of the mirror and which is resiliently urged in one direction about the single axis; and
   a pair of adjusting cams movable towards each other in contact with said support to pivot the support about the single axis in a reverse direction which is opposite to the one direction and movable away from each other to allow the support to be return urged in the one direction.

* * * * *